US008990224B1

(12) United States Patent
Ouellette et al.

(10) Patent No.: US 8,990,224 B1
(45) Date of Patent: Mar. 24, 2015

(54) DETECTING DOCUMENT TEXT THAT IS HARD TO READ

(71) Applicant: Google Inc., Mountain View, CA (US)

(72) Inventors: Lauren Ouellette, New York, NY (US); Gunes Erkan, New York, NY (US); Brad Alex Seiler, New York, NY (US); Xichen Yu, Morganville, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/674,320

(22) Filed: Nov. 12, 2012

Related U.S. Application Data

(60) Provisional application No. 61/559,658, filed on Nov. 14, 2011.

(51) Int. Cl.
G06F 7/00 (2006.01)
G06F 17/30 (2006.01)
(52) U.S. Cl.
CPC .. *G06F 7/00* (2013.01); *G06F 17/30* (2013.01)
USPC .......................................... 707/748; 707/754
(58) Field of Classification Search
USPC ................. 707/748, 758, 736, 723, 750
See application file for complete search history.

(56) References Cited

U.S. PATENT DOCUMENTS

| 6,718,303 | B2* | 4/2004 | Tang et al. | 704/235 |
| 8,060,501 | B1* | 11/2011 | Harik et al. | 707/724 |
| 8,494,287 | B2* | 7/2013 | Boutros et al. | 382/218 |
| 2004/0158569 | A1* | 8/2004 | Evans et al. | 707/100 |
| 2005/0261881 | A1* | 11/2005 | Jackson | 703/1 |
| 2006/0089924 | A1* | 4/2006 | Raskutti et al. | 707/1 |
| 2009/0037356 | A1* | 2/2009 | Rothstein et al. | 706/46 |
| 2009/0049478 | A1* | 2/2009 | Kwan | 725/46 |
| 2009/0234830 | A1* | 9/2009 | Olston et al. | 707/5 |
| 2012/0047131 | A1* | 2/2012 | Billawala et al. | 707/723 |
| 2012/0089387 | A1* | 4/2012 | Gamon et al. | 704/9 |

OTHER PUBLICATIONS

Goodwin; "Google Changing Titles in Search Results, SEOs Not Happy"; Feb. 20, 2011; 14 pages.
Hartzer; "Google May Change Your Title Tag in the Search Results"; Feb. 18, 2011; 4 pages.

* cited by examiner

*Primary Examiner* — Robert Beausoliel, Jr.
*Assistant Examiner* — Pedro J Santos
(74) *Attorney, Agent, or Firm* — Harrity & Harrity, LLP

(57) ABSTRACT

A computer system is configured to determine portions of text extracted from a corresponding group of documents; process a particular portion of text by a set of filters, where the particular portion of text may correspond to a particular document, and where each of the filters may generate a respective score based on processing the particular portion of text; calculate a readability score based on the respective scores generated by the filters; determine that the readability score satisfies a threshold score; and generate or select a new portion of text, for the particular document, based on determining that the readability score satisfies the threshold score.

21 Claims, 5 Drawing Sheets

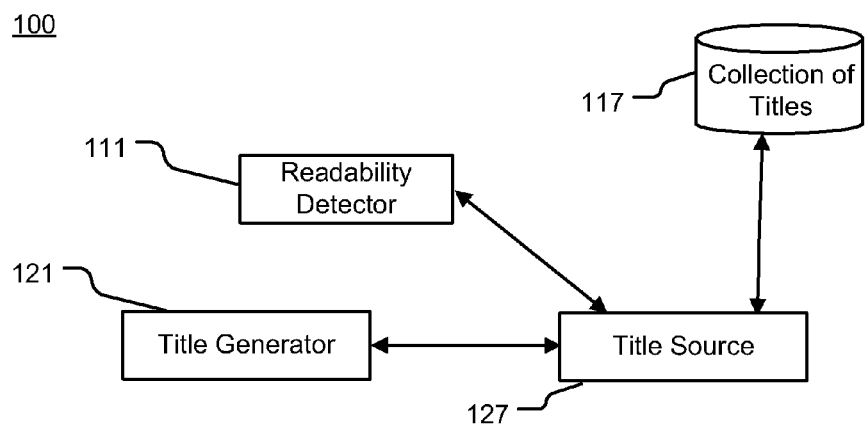
Fig. 1
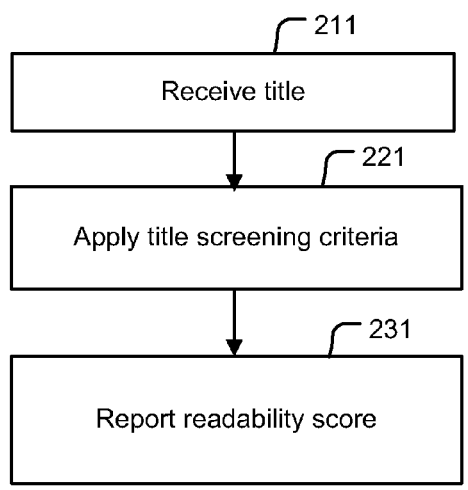
Fig. 2
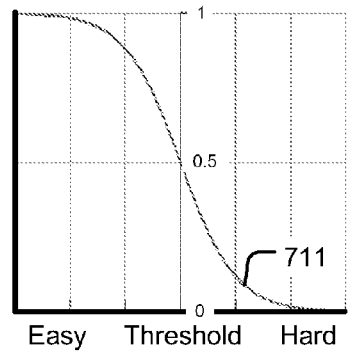
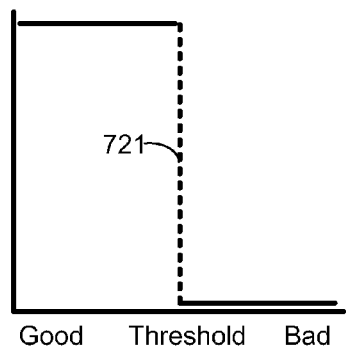
Fig. 7

Crate and Barrel Coupons - TechBargains [Better]
Crate and Barrel deals, discounts, coupon codes, and deals from Techbargains.com to help you save money on your next Crate and Barrel purchase.
http://www.techbargains.com/vendor_detail.cfm/618/Crate-and-Barrel-coupon-code

Crate and Barrel® Coupon Code, Crate and Barrel® Coupons, Crate ... [Hard to Read Trigram Repeat]
Crate and Barrel deals, discounts, coupon codes, and deals from Techbargains.com to help you save money on your next Crate and Barrel purchase.
http://www.techbargains.com/vendor_detail.cfm/618/Crate-and-Barrel-coupon-code

Manuka Honey [Better]
Honeymark is an importer of Manuka Honey and a manufacturer of natural Manuka Honeyskin care products.
http://manukahoney.net/

Manuka Honey, Honey Manuka, active Manuka Honey, Manuka Honey ... [Hard to Read Bigram Repeat]

How many calories in PopTarts? - Yahoo! Answers [Better]
How many calories are in Kellogs PopTarts? Please ...
http://answers.yahoo.com/question/index?qid=20070909045526AA8nCQX

How many calories in PopTarts? PLEASE ANSWER!!!!!!!? - Yahoo ... [Hard to Read Punctuation]
How many calories are in Kellogs PopTarts? Please ...
http://answers.yahoo.com/question/index?qid=20070909045526AA8nCQX

Fig. 4 arilson_tc - Twitter [Better] ⸺540
Check out m.twitter.com! Skip to navigation; Skip to sign in form ... Get updates via SMS by texting follow arilson_tc to 40404 in the United States ...
http://twitter.com/arilson_tc

[ツ] ÀʀɪLᴛOɴ [ツ] (@arilson_tc) on Twitter [Hard to Read Scripts] ⸺541
Check out m.twitter.com! Skip to navigation; Skip to sign in form ... Get updates via SMS by texting follow arilson_tc to 40404 in the United States ...
http://twitter.com/arilson_tc Recycled Synchilla Fleece Vest by Patagonia ® - Men's [Better] ⸺550
Patagonia quality with your logo. Made of durable 87% recycled polyester Synchilla® double-faced fleece.
http://www.epromos.com/product/8818360.html Recycled Synchilla Fleece Vest by Patagonia ® - Men's ... ⸺551
[Hard to Read Escaped Entry]
Patagonia quality with your logo. Made of durable 87% recycled polyester Synchilla® double-faced fleece.
http://www.epromos.com/product/8818360.html Point Break Live! @ New Rock Theater - Gapers Block [Better] ⸺560
Performances start March 19 and run through May 30 at New Rock Theater (3931 N. Elston Avenue). Tickets are $20 for Friday and Saturday ...
http://www.gapersblock.com/ac/2010/02/27/point-break-live-new-rock-theater/

<em>Point Break Live!</em> @ New Rock Theater - Gapers Block ⸺561
A/C ... [Hard to Read HTML tab]
Performances start March 19 and run through May 30 at New Rock Theater (3931 N. Elston Avenue). Tickets are $20 for Friday and Saturday ...
http://www.gapersblock.com/ac/2010/02/27/point-break-live-new-rock-theater/

Fig. 5

DETECTING DOCUMENT TEXT THAT IS HARD TO READ

RELATED APPLICATION

This application claims priority to and is a non-provisional application of U.S. Provisional Application No. 61/559,658, filed Nov. 14, 2011, the content of which is incorporated herein by reference.

BACKGROUND

The present disclosure relates to presenting lists of documents.

Titles can help a user quickly gain information about a document. However, some documents have titles that are not informative, or not easy to read. Furthermore, some documents may not have a title.

Some filters can detect missing titles or, for example, determine whether automatically generated titles include at least five letters for every four punctuation marks.

SUMMARY

According to some possible implementations, a method, performed by one or more processors of a computer system, may include determining titles embedded in or extracted from a corresponding set of documents; processing a particular title by a group of filters, where the particular title may correspond to a particular document, where each of the filters may generate a respective score based on processing the particular title; calculating a readability score based on the respective scores generated by the filters; determining that the readability score satisfies a threshold score; and generating or selecting a new title, for the particular document, based on determining that the readability score satisfies the threshold score.

According to some implementations, processing the particular title by one of the filters may include detecting a quantity of repetitions of an n-gram in the particular title, and generating the respective score based on the quantity of repetitions of the n-gram in the particular title.

According to some implementations, processing the particular title by one of the filters may include detecting a sequence of punctuation marks, without interceding words, in the particular title, and generating the respective score based on a length of the sequence of punctuation marks in the particular title.

According to some implementations, processing the particular title by one of the filters may include detecting a quantity of punctuation marks in the particular title, and generating the respective score based on the quantity of the punctuation marks in the particular title.

According to some implementations, processing the particular title by one of the filters may include detecting a quantity of script changes or font changes in the particular title, and generating the respective score based on the quantity of the script changes or the font changes in the particular title.

According to some implementations, processing the particular title by one of the filters may include detecting a measure of diversity of parts of speech included in the particular title, and generating the respective score based on the measure of diversity of the parts of speech included in the particular title.

According to some implementations, the filters may include a first filter and a second filter, where the first filter may generate a first score based on processing the particular title, and where the second filter may generate a second score based on processing the particular title, and where calculating the readability score may include assigning a first weight to the first score generated by the first filter to form a first weighted score, assigning a second weight to the second score generated by the second filter to form a second weighted score, and calculating the readability score based on the first weighted score and the second weighted score.

According to some implementations, a non-transitory computer-readable medium may store computer instructions executable by one or more processors. The instructions may include instructions that, when executed by the one or more processors, cause the one or more processors to extract a title from a document; analyze characteristics of the title by a group of filters, where each of the filters may generate a respective score based on analyzing one or more of the characteristics of the title; calculate a readability score based on the respective scores generated by the filters; determine that the readability score satisfies a threshold score; and generate or select a new title, for the document, based on determining that the readability score satisfies the threshold score.

According to some implementations, one or more instructions to analyze one or more of the characteristics of the title by one of the filters may include one or more instructions which, when executed by the one or more processors, cause the one or more processors to detect an escape sequence in the title, and generate the respective score based on detecting the escape sequence in the title.

According to some implementations, one or more instructions to analyze one or more of the characteristics of the title by one of the filters may include one or more instructions which, when executed by the one or more processors, cause the one or more processors to detect a hypertext markup language (HTML) tag in the title, and generate the respective score based on detecting the HTML tag in the title.

According to some implementations, one or more instructions to analyze one or more of the characteristics of the title by one of the filters may include one or more instructions which, when executed by the one or more processors, cause the one or more processors to detect a quantity of grammatical mistakes in the title, and generate the respective score based on the quantity of the grammatical mistakes in the title.

According to some implementations, one or more instructions to analyze one or more of the characteristics of the title by one of the filters may include one or more instructions which, when executed by the one or more processors, cause the one or more processors to detect a quantity of repetitions of an n-gram in the title, and generate the respective score based on the quantity of repetitions of the n-gram in the title.

According to some implementations, one or more instructions to analyze one or more of the characteristics of the title by one of the filters may include one or more instructions which, when executed by the one or more processors, cause the one or more processors to detect a sequence of punctuation marks, without interceding words, in the title or a quantity of punctuation marks in the title, and generate the respective score based on a length of the sequence of punctuation marks in the title or based on the quantity of the punctuation marks in the title.

According to some implementations, one or more instructions to analyze one or more of the characteristics of the title by one of the filters may include one or more instructions which, when executed by the one or more processors, cause the one or more processors to detect a quantity of script changes or font changes in the title, and generate the respective score based on the quantity of the script changes or the font changes in the title.

According to some implementations, one or more instructions to analyze one or more of the characteristics of the title by one or more of the filters may include one or more instructions which, when executed by the one or more processors, cause the one or more processors to detect a quantity of repetitions of two words in the title, detect a quantity of repetitions of three words in the title, and generate the respective score based on the quantity of the repetitions of the two words and the quantity of the repetitions of the three words.

According to some implementations, a computer system may include one or more processors to determine a set of portions of text extracted from a corresponding set of documents; process a particular portion of text, of the set of portions of text, by a group of filters, where the particular portion of text may correspond to a particular document of the set of documents, where each of the filters may generate a respective score based on processing the particular portion of text; calculate a readability score based on the respective scores generated by the filters; determine that the readability score satisfies a threshold score; and generate or select a new portion of text, for the particular document, based on determining that the readability score satisfies the threshold score.

According to some implementations, the one or more processors, when processing the particular portion of text by one of the filters, may detect a quantity of repetitions of an n-gram in the particular portion of text, determine a total quantity of n-grams in the particular portion of text, determine a ratio of the quantity of repetitions of the n-gram to the total quantity of n-grams, and generate the respective score based on the ratio.

According to some implementations, the one or more processors, when processing the particular portion of text by one of the filters, may detect a sequence of punctuation marks, without interceding words, in the particular portion of text or a quantity of punctuation marks in the particular portion of text, and generate the respective score based on a length of the sequence of punctuation marks in the particular portion of text or based on the quantity of the punctuation marks in the particular portion of text.

According to some implementations, the one or more processors, when processing the particular portion of text by one of the filters, may detect a quantity of script changes or font changes in the particular portion of text, and generate the respective score based on the quantity of the script changes or the font changes in the particular portion of text.

According to some implementations, the one or more processors, when processing the particular portion of text by one of the filters, may detect a measure of diversity of parts of speech included in the particular portion of text, and generate the respective score based on the measure of diversity of the parts of speech included in the particular portion of text.

According to some implementations, the filters may include a first filter and a second filter, the first filter may generate a first score based on processing the particular portion of text, and the second filter may generate a second score based on processing the particular portion of text, and where the one or more processors, when calculating the readability score, may assign a first weight to the first score generated by the first filter to form a first weighted score, assign a second weight to the second score generated by the second filter to form a second weighted score, and calculate the readability score based on the first weighted score and the second weighted score.

Particular implementations of the subject matter described in this specification can be implemented so as to realize one or more of the following advantages. Hard to read titles of web pages can be improved. Web site authors create titles for web pages that are distinct from the URL address of the web page. Not all authors do a good job. Some authors may attempt to mislead a user with distracting titles. Some titles are difficult to read. When a user is scanning search results that list web page titles, the difficult to read titles make it difficult to select the most interesting web pages to view. Thus, improving hard to read titles can improve user experiences.

This is believed to be a new problem for automated processing. While users have long experienced bad titles, bad titles typically have been considered part of the environment, not something to be automatically flagged for revision.

Other types of documents, for example, Word and Acrobat documents can similarly have their title, or short descriptions that are distinct from the file name used to retrieve the document, e.g., from metadata fields, improved. Bad titles can be improved for a variety of documents, in addition to web pages, for example, email subjects, message board posts, advertising headlines, news articles, scholarly articles, books, section headings, or patent titles.

While implementations will be described in terms of titles of documents, these implementations may also be applied to other forms of document text, such as snippets and summaries.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 1 illustrates a block diagram of an example environment in which it is useful to detect titles that are hard to read.

FIG. 2 is a flow chart illustrating an example process for detecting titles that are hard to read.

FIGS. 4-5 illustrate examples of title readability problems addressed by automatic identification of hard to read titles.

FIG. 7 illustrates sigmoid and step functions that can be used to score individual filter results.

DETAILED DESCRIPTION

Figure 3:
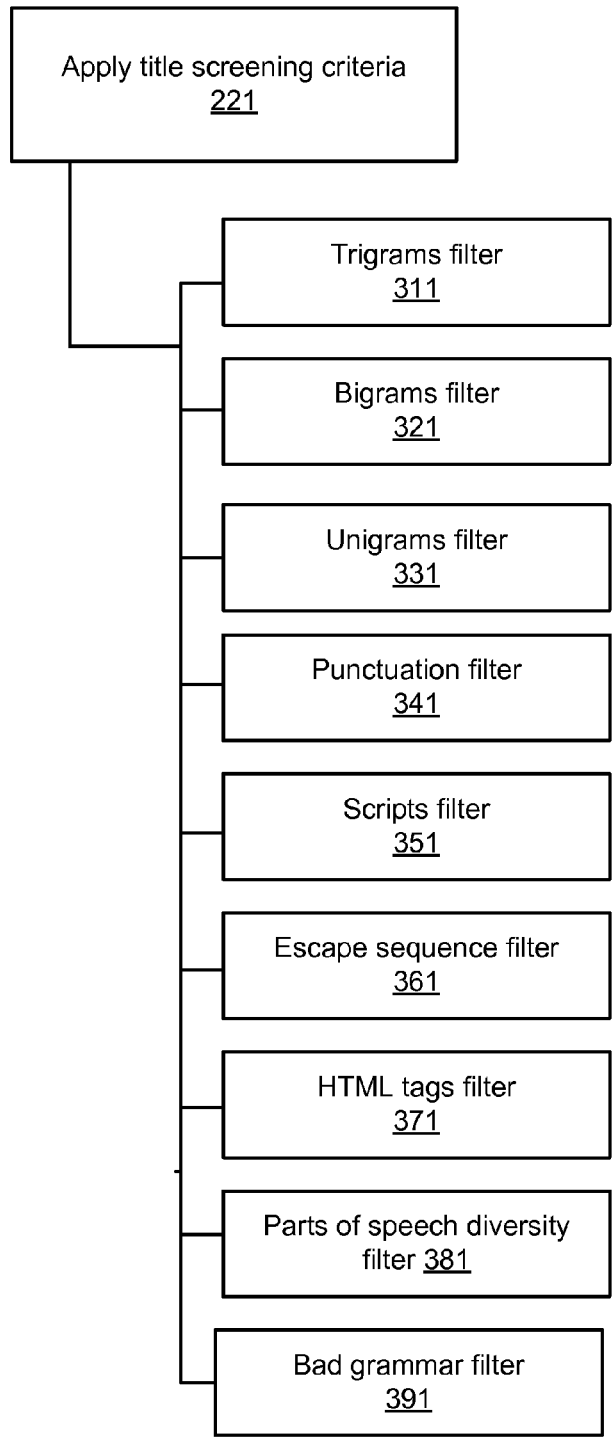
FIG. 3 identifies examples of particular filters or filtering processes that may be applied in the course of title screening.

The solution described involves automatically detecting signals in titles correlated with a bad user experience and flagging bad titles for further processing. This solution can be applied to both to titles assigned to documents (such as web pages) and to automatically generated titles to be assigned to documents.

The same technology can be applied to snippets or summaries of text that are extracted from a document to display in a search results list accompanying the title. Snippets or summaries may be automatically generated excerpts. They may be cached in advance or generated on the fly. Either kind of snippet or summary could be screened for bad composition.

The HTML title of a web page may be difficult to read for a number of reasons. Some webmasters choose titles that are repetitive or keyword-stuffed in an attempt to draw clicks or optimize search rankings. Other titles may contain distracting punctuation or symbols, whether used for decorative purposes or included unintentionally.

FIG. 1 illustrates a block diagram of an example system 100 for detecting titles that are hard to read. The system 100 includes a readability detector 111, a title source 127 and alternative sources of titles.

The readability detector 111 receives titles from the title source 127 and determines which titles are difficult to read. In some implementations, the title source 127 provides titles that were detected on web pages, for example, during crawling of web pages. The title source 127 can provide cached titles that are stored, for example, in a collection of titles 117. Alternatively, but not illustrated, the title source 127 can provide titles detected during crawling, and the detected titles can be used as the title source 127 without being cached in the collection of titles 117. Titles may be generated by a title generator 121 that is used to automatically generate titles for web pages that lack titles.

The readability detector 111 includes memory for storage of data and software applications, a processor for accessing data and executing applications, input and output devices that allow for user interaction, and components that facilitate communication with the title source 127. The title source 127 and readability detector 111 may be connected over a local or wide area network or may reside on the same machine or cluster of machines.

The title source 127 also includes memory for storage of data and software applications, a processor for accessing data and executing applications, and components that facilitate communication with at least the readability detector 111. In various implementations, the title source 127 also may communicate with a title generator 121 or a database collection of titles 117.

The collection of titles 117 may be collectively stored on multiple computers and/or storage devices. The title may be embedded in documents or extracted from documents associated with unique document identifiers. A unique document identifier may be a Uniform Resource Locator (URL) of the associated document or a qualified filename. A document yielding a title in the collection 117 may be a web page, a word processing document, an XML document, a portable document format (PDF) document, or any other type of electronic document. A document can include content such as words, phrases, images, and videos. In some implementations, the collection 117 is obtained from the World Wide Web.

Many other configurations of the system 100 are possible having more or fewer components than the system 100 shown in FIG. 1. For example, the system 100 can include client devices.

FIG. 2 is a flow chart illustrating an example process for detecting titles that are hard to read. For convenience, the steps of the process are described with respect to a system, for example, the readability detector 111 described above with reference to FIG. 1, that performs the process.

The system receives a title to process 211, for example, from a title source, such as the title source 127 described above with reference to FIG. 1. The system applies one or more title screening criteria 221, for instance by invoking a series of filters and applying the filters to the title. The system uses the title screening criteria to generate a readability score for the title, as described in more detail below with reference to FIG. 3. In some implementations, the readability score is a single score. In other implementations, the readability score is based on a combination of multiple scores. In some implementations, multiple scores or decisions by individual filters are combined into a composite readability score. In some implementations, the composite readability score may be based on a weighted combination of the scores from the filters. The system reports the readability score 231.

The title source or other component receives the readability score. In some implementations, the title source stores the readability score for later processing. In implementations where a generated title is being scored, a readability score, which satisfies a threshold, may cause a new title to be generated, e.g., by a title generator 121 or other system.

Further processing, not shown in the figure, may follow reporting of titles identified as hard to read. For instance, titles assigned a difficult to read score may be presented to a user either for confirmation as a bad title or for editorial correction. The titles presented to the user could be sorted by readability score or by title string. Alternatively, when coupled with an automatic title generation process, the further processing of a rejected title could include generation or selection of an alternative title. The title judged could be an original document title or one automatically generated. For documents associated with authors, the further processing could include messaging to invite the author to revise the title.

FIG. 3 illustrates example filters 311-391 that may be applied in the course of title screening 221. Several example filters are described. Any one or more of the filters illustrated in FIG. 3 can be used to analyze one or more characteristics of a title and generate the readability score.

Each filter returns a particular score for a given title. In some implementations, the readability score is a composite readability score derived from the scores for multiple filters. Individual filters may be scored in a variety of ways, relative to a selected threshold. The scoring function of some filters may be sigmoid or logistic curve, as depicted in FIG. 7, reference 711 or by another function, such as arctangent, hyperbolic tangent, the error function, or polynomial function. Curve 711 is an example of the sigmoid curve. In the balance of this disclosure, reference to a sigmoid function or curve includes the families of functions or curves described above. In some implementations, the output of the sigmoid function ranges from zero (e.g., for a bad title) to one (e.g., for a good title). The input to the sigmoid function depends on the filter, as will become apparent below. Another transfer function used by some filters is a step function 721. This scoring function expresses error conditions. The results of multiple filters may be combined. For example, in some implementations, a combined score is the minimum score from any filter. In this implementation, any filter can cause a title to be considered hard to read. Another way to combine scores is by multiplying the scores together and using the result. This form of combination gives strong effect to any score that is zero. Alternatively, the scores could be added together or a lowest quartile or median score could be used. A composite readability score may be selected from scores output by multiple filters, e.g., the minimum, maximum, or median score. In other implementations, the composite readability score is the result of a function that combines multiple scores, such as an additive or multiplicative combination of the scores. Alternatively, the filters could be applied in turn, and each successive filter applied only if the results of prior filters had not yet scored the title as a bad title.

A trigram filter 311 detects repeated sequences of three words. As used herein, the term "words" means sequences of characters having a collective meaning. A threshold, such as two or three, can be set for how many repetitions of trigrams are required before a title is flagged as bad. The threshold may be language dependent, to take into account the different usages of repetition in different languages. The sigmoid scoring function can be applied, sharply decreasing the score of the title as the threshold is reached or exceeded. The more that the threshold is exceeded, the worse the score.

A bigram filter 321 detects repeated sequences of two words. As with the trigram filter, a threshold can be set for how many repetitions of bigrams are required before a title is flagged as bad. The threshold may be language dependent. As with the trigram filter, the sigmoid scoring function can be applied by the bigram filter 321, sharply decreasing the score of the title as the threshold is reached or exceeded. The more that the threshold is exceeded, the worse the score.

A unigram filter 331 detects repeated single words. A threshold can be set for how many repetitions of unigrams are required before a title is flagged as bad. The threshold may be language dependent. In some implementations, repetition of multiple words is combined into a single repetition factor. The same word repeated 8 times might get the same repetition factor as one word repeated 5 times plus another word repeated 3 times. The repetition factor is compared to the threshold.

Another example filter, not illustrated in FIG. 3, is an n-gram filter, which is a filter that detects sequences of n words, where n is an integer that is one or greater. A threshold can be set for how many repetitions of n-grams are required before a title is flagged as bad. The threshold may be language dependent. Any of the n-gram filters described above can use stemming and stop-word detection to make the filters robust against simple variations in words or phrases.

As with the bigram filter 321 and the trigram filter 311, the sigmoid scoring function 711 can be applied by the unigram filter 331 and the n-gram filter, sharply decreasing the score of the title as the threshold is reached or exceeded. The more that the threshold is exceeded, the worse the score.

The term repetition has been used in conjunction with the trigram filter 311, the bigram filter 321, the unigram filter 331, and the n-gram filter. This repetition might refer to an exact match of words or a substantial match of words, such as words sharing a same stem, words that are synonyms, or the like.

A punctuation filter 341 detects the number of punctuation marks in a title and/or combinations of punctuation marks. A variety of thresholds can be set for repetition of the same punctuation mark, consecutive but different punctuation marks, or the total number of punctuation marks throughout a title. In one implementation, the threshold is compared to the total count of punctuation marks. The sigmoid scoring function 711 can be applied, sharply decreasing the score of the title as the threshold is reached or exceeded. The more that the threshold is exceeded, the worse the score. Alternatively, a step scoring function could be applied.

A scripts filter 351 detects changes in scripts. In some implementations, the system detects changes in scripts, such as ISO 15924 scripts or Unicode scripts from the Unicode consortium, however, any set of scripts can be used. The scripts filter 351 can be extended, for documents that accept fonts in addition to scripts, to detecting changes in fonts, such as changes between Arial and Times Roman in Latin script. A threshold can be set to determine the maximum number of different scripts acceptable in a title. The threshold is likely to vary among languages, particularly in recognition that some pictogram languages, such as Japanese, regularly mix symbols from different scripts. In one implementation, the threshold is compared to the total count of scripts, of script transitions, of fonts, or of font transitions. The sigmoid scoring function 711 can be applied, sharply decreasing the score of the title as the threshold is reached or exceeded. The more that the threshold is exceeded, the worse the score. Alternatively, a step scoring function could be applied.

An escape sequence filter 361 detects escape characters and sequences in titles where the escape characters and sequences are misinterpreted. The term "escape character" means a character that invokes an alternative interpretation of subsequent characters in a character sequence. The term "escape sequence" means one or more escape characters and the character sequence that follows, which is supposed to have an alternative interpretation due to the preceding escape characters. Escape sequences do not belong in and are misinterpreted within titles. Misinterpreted escape sequences are difficult to read. Thresholds are not needed with escape characters and sequences, as every escape character and sequence should be flagged as making a string difficult to read. The scoring function may be the step function 721 or another binary function. Escape sequences are readily detected by parsing or string matching.

An HTML tags filter 371 detects HTML tags in titles. All HTML tags in titles will be ignored, because the HTML specification does not provide for tags between the HTML tags <title> and </title>. This can make the title difficult to read. Thresholds are not needed with HTML tags, because the specification does not provide for tags between the HTML tags <title> and </title>. The scoring function may be the step function 721 or another binary function. Such HTML tags are readily detected by parsing or string matching.

A parts of speech diversity filter 381 detects diversity among parts of speech represented by words in a title. For instance, a title with all verbs and no nouns or with all adverbs may be hard to read. A part of speech tagger tags each token, e.g., word, with its part of speech. One signal used was the fraction of tokens covered by the most common part of speech. Another signal was the number of distinct parts of speech. If there was not enough diversity of parts of speech, the title was penalized. A variety of thresholds and rules are likely to be useful with a parts of speech diversity filter 381. In one implementation, the threshold is compared to the fraction of tokens covered by the most common part of speech or to the number of distinct parts of speech found, or to both. The sigmoid scoring function 711 can be applied, sharply decreasing the score of the title as the threshold is reached or exceeded. The more that the threshold is exceeded, the worse the score. Alternatively, a step scoring function could be applied.

A bad grammar filter 391 that detects poor grammatical constructions could, optionally, be added. For example, bad grammar filter 391 may detect grammatical mistakes in a title and, based on the nature of the grammatical mistakes and/or a quantity of the grammatical mistakes, determine whether to classify the title as hard to read. Either the sigmoid scoring or threshold scoring functions or their variations could be applied to bad grammar filter 391.

The results of applying multiple filters can be combined into a single score, as described above. Alternatively, the filters could be applied in turn, and each successive filter applied only if the results of prior filters had not yet scored the title as a bad title.

Illustrations of some title readability problems addressed by these filters appear in FIGS. 4-5. The repeated trigram filter 311 addresses repeated trigrams, as illustrated in FIG. 4. The example, "Crate and Barrel® Coupon Code, Crate and Barrel® Coupons, Crate . . . " 411 repeats at least three words at least twice. In some implementations, the symbol ® is treated as a separate word for purposes of identifying trigrams. Sometimes, an implementation might exclude noise words such as "and" from an n-gram length count. Sometimes, word stems are used, so that coupon and coupons match. A sample of a better title that does not have the same readability problems as 411 is "Crate and Barrel Coupons—TechBargins" 410. The trigram filter 311 can apply a threshold to decide that a title is hard to read or the trigram filter 311 can score the title as a function of the number of trigram repetitions. The scoring can be language dependent.

There is also an example of bigram repetition 421, which is addressed by the repeated bigram filter 321. In this example, "Manuka Honey" is repeated four times. A better version of the title 420 includes just the two words, without repetition or modifier. Another version of the title might further identify "Honeymark" as the importer. As with trigrams, the bigram filter 321 can apply a threshold to decide that a title is hard to read or the bigram filter 321 can score the title as a function of the number of trigram repetitions. The threshold and scoring can be language dependent.

Not separately shown but readily understood are unigram (single word) and n-gram repetition. The examples of trigram and bigram repetition (411, 421) also can be taken as examples of unigram repetition. In 411, "Crate" is repeated three times. In 421, "Manuka" is repeated four times and so is "Honey". It is not necessary for instances of a word to be repeated consecutively for the unigrams filter 311 to detect the repetition. Either a unigram or n-gram filter can apply a threshold to decide that a title is hard to read or the unigram or n-gram filter can score the title as a function of the number of single word or n-gram repetitions. The thresholds and scoring can be language dependent. As described above, n-gram filters can use stemming and stop-word detection to make the filters robust against simple variations in words or phrases.

An example of repeated punctuation is shown in entry 431. Here, multiple exclamation marks appear after "PLEASE ANSWER" in the title. This filter 341 may be triggered by a count of exclamation points or other punctuation marks, by a sequence of consecutive punctuation marks of the same type or different types, or by a total number of punctuation marks. A better version of the title 430 is given for comparison and not to limit the disclosed technology that automatically detects hard to read titles. Of course, many different improved titles could be constructed.

Examples of hard to read titles continue in FIG. 5, with an example of using multiple scripts 541 to stylize a user's name. The scripts filter 351 tests the number of scripts used in the title. Alternatively, it could test the number of fonts, as described above.

An example of an escaped entity 551 shows the characters "®:", which would be intended to be reproduced as a registered trademark symbol ® 550. Escape sequences are readily detected by parsing or string matching.

A similar example of HTML tags 561 shows removal of the tags 560 from a title that does not make use of the tags. Such HTML tags are readily detected by parsing or string matching.

Not shown in FIG. 5 is an example of inadequate diversity among parts of speech. In a speech parts diversity filter 381, a part of speech tagger tags each token with its part of speech. One signal used was the fraction of tokens covered by the most common part of speech. Another signal was the number of distinct parts of speech. If there was not enough diversity of parts of speech, the title was penalized.

While the implementations of FIG. 2 through FIG. 5 were described as relating to titles, other implementations may relate to other portions of text, such as snippets of text or summaries of text. These other implementations may use the same or similar techniques described with regard to FIG. 2 through FIG. 5, perhaps with different thresholds than used with regard to the implementations of FIG. 2 through FIG. 5. For example, rather than comparing a quantity of repetitions of a bigram to a threshold to determine whether to flag text as bad, a ratio of the quantity of repetitions of the bigram to a total number of bigrams appearing in the text may be compared to a threshold to determine whether to flag the text as bad. In some implementations, this same technique may be used for trigrams, unigrams, and n-grams appearing in the text.

Figure 6:
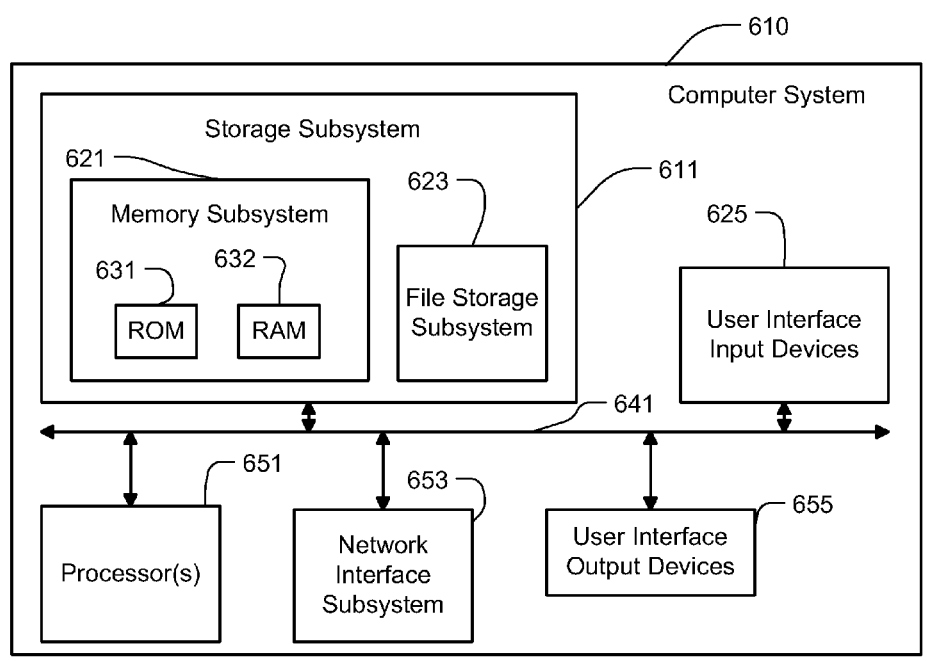
FIG. 6 is a block diagram of an example computer system.

FIG. 6 is a block diagram of an example computer system 610 on which the various systems described above could be implemented. Computer system 610 typically includes at least one processor 651, which communicates with a number of peripheral devices via bus subsystem 641. These peripheral devices may include a storage subsystem 611, comprising for example memory devices 631, 632 and a file storage subsystem 623, user interface input devices 625, user interface output devices 655, and a network interface subsystem 653. The input and output devices allow user interaction with computer system 610. Network interface subsystem 653 provides an interface to a communication network and is coupled via the communication network to corresponding interface devices in other computer systems. The communication network may comprise many interconnected computer systems and communication links. These communication links may be wireline links, optical links, wireless links, or any other mechanisms for communication of information. In one implementation, the communication network attached to the interface is the Internet; in other implementations, the communication network may be any suitable computer network.

User interface input devices 625 may include a keyboard; pointing devices such as a mouse, trackball, touchpad, or graphics tablet; a scanner; a touchscreen incorporated into a display; audio input devices, such as voice recognition systems or microphones; and other types of input devices. In general, use of the term "input device" is intended to include possible types of devices and ways to input information into computer system 610 or onto the communication network.

User interface output devices 655 may include a display subsystem, a printer, a fax machine, or non-visual displays, such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 610 to the user or to another machine or computer system.

Storage subsystem 611 stores programming and data constructs that provide the functionality of some or all of the modules described throughout this disclosure. These software modules are generally executed by processor 651 alone or in combination with other processors.

Memory 621 used in the storage subsystem can include a number of memories including a main random access memory (RAM) 632 for storage of instructions and data during program execution and a read only memory (ROM) 631 in which fixed instructions are stored. A file storage subsystem can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 623 of the storage subsystem 611, or in other machines accessible by the processor.

Bus subsystem 641 provides a mechanism for letting the various components and subsystems of computer system 610 communicate with each other as intended. Although bus subsystem 641 is shown schematically as a single bus, alternative implementations of the bus subsystem may use multiple busses.

Processor 651 may include one or more processors, one or more microprocessors, or processing logic (e.g., application specific integrated circuits (ASICs), field programmable gate arrays (FPGAs), etc.) that interpret and execute instructions.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as an example using a so-called particular computer adapted by programming instructions to perform as disclosed. Many other configurations of computer system 610 are possible having additional or fewer components than the computer system depicted in FIG. 6.

Computer system 610 may perform certain operations described herein. Computer system 610 may perform these operations in response to processor 651 executing software instructions contained in a computer-readable medium, such as a memory in memory subsystem 621. A computer-readable medium may be defined as a non-transitory memory device. A memory device may include space within a single physical storage device or spread across multiple physical storage devices. The software instructions may be read into memory subsystem 621 from another computer-readable medium or from another device. The software instructions contained in memory subsystem 621 may cause processor 651 to perform processes described herein. Alternatively, hardwired circuitry may be used in place of or in combination with software instructions to implement processes described herein. Thus, implementations described herein are not limited to any specific combination of hardware circuitry and software.

While the present disclosure includes reference to the implementations and examples detailed above, it is understood that these examples are intended in an illustrative rather than in a limiting sense. Computer-assisted processing is implicated in the described implementations. Accordingly, the present technologies may be embodied in methods for detecting difficult to read titles, snippets, and summaries, systems including logic and resources to detect difficult to read titles, snippets, and summaries, systems that take advantage of computer-assisted methods for detecting difficult to read titles, snippets, and summaries, media impressed with logic to detect difficult to read titles, snippets, and summaries, data streams impressed with logic to detect difficult to read titles, snippets, and summaries, or computer-accessible services that carry out computer-assisted methods for detecting difficult to read titles, snippets, and summaries. It is contemplated that modifications and combinations will be within the scope of the following claims.

What we claim is:

1. A method performed by one or more processors of a computer system, the method comprising:
   determining, by the one or more processors, a plurality of titles embedded in or extracted from a corresponding plurality of documents;
   processing, by the one or more processors, a particular title, of the plurality of titles, by applying a first filter, of a plurality of filters, to generate a first score,
      the particular title corresponding to a particular document of the plurality of documents;
   processing, by the one or more processors, the particular title by applying a second filter, of the plurality of filters, to generate a second score,
      processing the particular title by applying the second filter, of the plurality of filters, including:
         determining a total count of script changes or font changes in the particular title, and
         generating the second score based on the total count of the script changes or the font changes in the particular title;
   assigning, by the one or more processors, a first weight to the first score to form a first weighted score;
   assigning, by the one or more processors, a second weight to the second score to form a second weighted score;
   calculating, by the one or more processors, a readability score based on the first weighted score and the second weighted score;
   determining, by the one or more processors, that the readability score satisfies a threshold score;
   generating or selecting a new title, for the particular document, based on determining that the readability score satisfies the threshold score; and
   assigning the new title to the particular document.

2. The method of claim 1, where processing the particular title by applying the first filter, of the plurality of filters, includes:
   detecting a quantity of repetitions of an n-gram in the particular title, and
   generating the first score based on the quantity of repetitions of the n-gram in the particular title.

3. The method of claim 1, where processing the particular title by applying the first filter, of the plurality of filters, includes:
   detecting a sequence of two or more punctuation marks, without interceding words, in the particular title, and
   generating the first score based on a length of the sequence of the two or more punctuation marks in the particular title.

4. The method of claim 1, where processing the particular title by applying the first filter, of the plurality of filters, includes:
   detecting a quantity of punctuation marks in the particular title, and
   generating the first score based on the quantity of the punctuation marks in the particular title.

5. The method of claim 1, where processing the particular title by applying the first filter, of the plurality of filters, includes:
   detecting a measure of diversity of parts of speech included in the particular title, and
   generating the first score based on the measure of diversity of the parts of speech included in the particular title.

6. A non-transitory computer-readable medium storing instructions, the instructions comprising:
   a plurality of instructions that, when executed by one or more processors, cause the one or more processors to:
      extract a title from a document;
      generate a first score for the title by applying a first filter of a plurality of filters;
      determine a total count of script changes or font changes in the title by applying a second filter of the plurality of filters;
      generate a second score for the title based on the total count of the script changes or the font changes in the particular title;
      assign a first weight to the first score to form a first weighted score;
      assign a second weight to the second score to form a second weighted score;
      calculate a readability score based on the first weighted score and the second weighted score;
      determine that the readability score satisfies a threshold score;

generate or select a new title, for the document, based on determining that the readability score satisfies the threshold score; and assign the new title to the document.

7. The non-transitory computer-readable medium of claim 6, where one or more instructions, of the plurality of instructions, to generate the first score include:

one or more instructions which, when executed by the one or more processors, cause the one or more processors to:
detect an escape sequence in the title, and
generate the first score based on detecting the escape sequence in the title.

8. The non-transitory computer-readable medium of claim 6, where one or more instructions, of the plurality of instructions, to generate the first score include:

one or more instructions which, when executed by the one or more processors, cause the one or more processors to:
detect a hypertext markup language (HTML) tag in the title, and
generate the first score based on detecting the HTML tag in the title.

9. The non-transitory computer-readable medium of claim 6, where one or more instructions, of the plurality of instructions, to generate the first score include:

one or more instructions which, when executed by the one or more processors, cause the one or more processors to:
detect a quantity of grammatical mistakes in the title, and
generate the first score based on the quantity of the grammatical mistakes in the title.

10. The non-transitory computer-readable medium of claim 6, where one or more instructions, of the plurality of instructions, to generate the first score include:

one or more instructions which, when executed by the one or more processors, cause the one or more processors to:
detect a quantity of repetitions of an n-gram in the title, and
generate the first score based on the quantity of repetitions of the n-gram in the title.

11. The non-transitory computer-readable medium of claim 6, where one or more instructions, of the plurality of instructions, to generate the first score include:

one or more instructions which, when executed by the one or more processors, cause the one or more processors to:
detect a total count of repetitions of two words in the title,
detect a total count of repetitions of three words in the title, and
generate the first score based on the total count of the repetitions of the two words and the total count of the repetitions of the three words.

12. A computer system comprising:
one or more processors to:
determine a plurality of portions of text extracted from a corresponding plurality of documents;
process a particular portion of text, of the plurality of portions of text, by applying a first filter, of a plurality of filters, to generate a first score,
the particular portion of text corresponding to a particular document of the plurality of documents;
determine a total count of script changes or font changes in the particular portion of text by applying a second filter of the plurality of filters;
generate a second score based on the total count of the script changes or the font changes in the particular portion of text;

determine a readability score based on the first score and the second score;
determine that the readability score satisfies a threshold score;
generate or select a new portion of text, for the particular document, based on determining that the readability score satisfies the threshold score; and
assign the new portion of text to the particular document.

13. The computer system of claim 12, where the one or more processors, when processing the particular portion of text by applying the first filter, are to:
detect a quantity of repetitions of an n-gram in the particular portion of text,
determine a total quantity of n-grams in the particular portion of text,
determine a ratio of the quantity of repetitions of the n-gram to the total quantity of n-grams, and
generate the first score based on the ratio.

14. The computer system of claim 12, where the one or more processors, when processing the particular portion of text by applying the first filter, are to:
detect a sequence of punctuation marks, without interceding words, in the particular portion of text or a quantity of punctuation marks in the particular portion of text, and
generate the first score based on a length of the sequence of punctuation marks in the particular portion of text or based on the quantity of the punctuation marks in the particular portion of text.

15. The computer system of claim 12, where the one or more processors, when processing the particular portion of text by applying the first filter, are to:
detect a measure of diversity of parts of speech included in the particular portion of text, and
generate the first score based on the measure of diversity of the parts of speech included in the particular portion of text.

16. The computer system of claim 12, where the one or more processors, when processing the particular portion of text by applying the first filter, are to:
detect a quantity of mistakes in the particular portion of text, and
generate the first score based on the quantity of the mistakes in the particular portion of text.

17. The computer system of claim 12,
where the first score includes a first value between zero and one, and
where the second score includes a second value between zero and one.

18. The method of claim 1, where calculating the readability score comprises:
calculating the readability score by multiplying the first weighted score and the second weighted score.

19. The method of claim 1, where calculating the readability score comprises:
selecting the first weighted score as the readability score based on the first weighted score being a lesser score of the first weighted score and the second weighted score.

20. The non-transitory computer-readable medium of claim 6, where one or more instructions, of the plurality of instructions, to generate the first score include:
one or more instructions which, when executed by the one or more processors, cause the one or more processors to:
detect a sequence of two or more punctuation marks, without interceding words, in the title by applying the first filter, and generate the first score for the title based on a length of the sequence of the two or more punctuation marks.

21. The computer system of claim 12, where the one or more processors, when determining the readability score based on the first score and the second score, are to:
   determine that the first score is less than the second score, and
   select the first score as the readability score based on the first score being less than the second score.

\* \* \* \* \*